(12) United States Patent
Sebastian

(10) Patent No.: US 6,577,086 B2
(45) Date of Patent: Jun. 10, 2003

(54) DEVICE FOR DISCONNECTING A NEUTRAL POINT OF A MOTOR

(75) Inventor: Tomy Sebastian, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 3 days.

(21) Appl. No.: 09/811,935

(22) Filed: Mar. 19, 2001

(65) Prior Publication Data

US 2002/0130631 A1 Sep. 19, 2002

(51) Int. Cl.[7] .............................................. H02K 23/00
(52) U.S. Cl. ...................... 318/254; 318/138; 318/439; 318/434; 388/903
(58) Field of Search ................................ 318/254, 138, 318/43, 434, 439; 388/903

(56) References Cited

U.S. PATENT DOCUMENTS

| | | | | |
|---|---|---|---|---|
| 4,309,644 A | * | 1/1982 | Reimers et al. ............. | 318/139 |
| 4,757,869 A | * | 7/1988 | Morishita et al. ........... | 180/446 |
| 5,039,926 A | * | 8/1991 | Morishita et al. ........... | 180/446 |
| 5,093,583 A | * | 3/1992 | Mashino et al. ............. | 219/203 |
| 5,491,393 A | * | 2/1996 | Uesugi ........................ | 318/138 |
| 5,506,776 A | * | 4/1996 | Fushimi et al. .............. | 180/413 |
| 5,661,368 A | * | 8/1997 | Deol et al. ................... | 307/10.8 |
| 5,710,698 A | * | 1/1998 | Lai et al. ...................... | 363/132 |
| 5,729,446 A | * | 3/1998 | Gruning ....................... | 363/54 |
| 5,751,128 A | * | 5/1998 | Chalupa et al. .............. | 318/138 |
| 5,939,850 A | * | 8/1999 | Kondoh ....................... | 318/254 |
| 5,982,067 A | | 11/1999 | Sebastian et al. ........... | 310/184 |

* cited by examiner

*Primary Examiner*—Rita Leykin
(74) *Attorney, Agent, or Firm*—Edmund P. Anderson

(57) ABSTRACT

A circuit for disconnecting a neutral point of an electric machine includes an inductance connected to a lead of the electric machine; a three-terminal solid-state switch that has a first terminal connected to the inductance, a second terminal connected to the neutral point, and a third terminal for controlling a flow of current between the first and second terminals; a controlling circuit coupled to the three-terminal solid-state switch that includes a first loop that has a power source, a resistance, and a voltage regulator to maintain a first voltage upon the third terminal, and a second loop that has a power source, a resistance, and a trigger switch being controllably switched on to thereby close the first loop whereby a second voltage is applied to the three-terminal solid-state switch to thereby substantially electrically disconnect the first terminal from the second terminal.

11 Claims, 2 Drawing Sheets

US 6,577,086 B2

DEVICE FOR DISCONNECTING A NEUTRAL POINT OF A MOTOR

TECHNICAL FIELD

This disclosure relates to motors, and more particularly, to a device for disconnecting a neutral point of a motor.

BACKGROUND

An electric machine with a "Y" connection, such as for example one comprising a motor with three inductive phase-windings, typically has a neutral point or terminal. For a brushless permanent magnet ("PM") motor, the stator is wired to the neutral point while a complimentary rotor is not so wired. During ordinary operation, the neutral point is electrically connected to the three legs of the "Y" connection. However, under certain conditions, such as for example in a 12-Volt Electric Power Steering ("EPS") system, a mechanical relay is used to open or disconnect a "Y" connection of a motor in certain modes in order to disconnect the neutral point. Typically, a mechanical relay is used to open the neutral point because of the desirably low voltage drop across its contacts. Unfortunately, mechanical relays are undesirably large, as well as costly to operate. Typical semiconductor devices are unsuitable replacements for the mechanical relay at lower voltages because of the inefficient higher voltage drop across their terminals. Therefore, it is desirable to have a smaller, more efficient and less costly alternative.

SUMMARY

The above discussed and other drawbacks and deficiencies of the prior art are overcome or alleviated by a circuit for disconnecting a neutral point in an electric machine that includes an inductance; a three-terminal solid-state switch that has a first terminal connected to the inductance, a second terminal connected to the neutral point, and a third terminal for controlling a flow of current between the first and second terminals; a controlling circuit coupled to the three-terminal solid-state switch that includes a first loop that has a power source, a resistance, and a voltage regulator to maintain a first voltage upon the third terminal and cause the three-terminal solid-state switch to switch on to thereby electrically connect the first terminal to the second terminal, and a second loop that has a resistance, a power source, and a trigger switch being controllably switched closed to thereby close the second loop to apply a second voltage to the third terminal, thereby causing the three-terminal solid-state switch to switch off to electrically disconnect the first terminal from the second terminal.

DESCRIPTION OF AN EXEMPLARY EMBODIMENT

Figure 1:
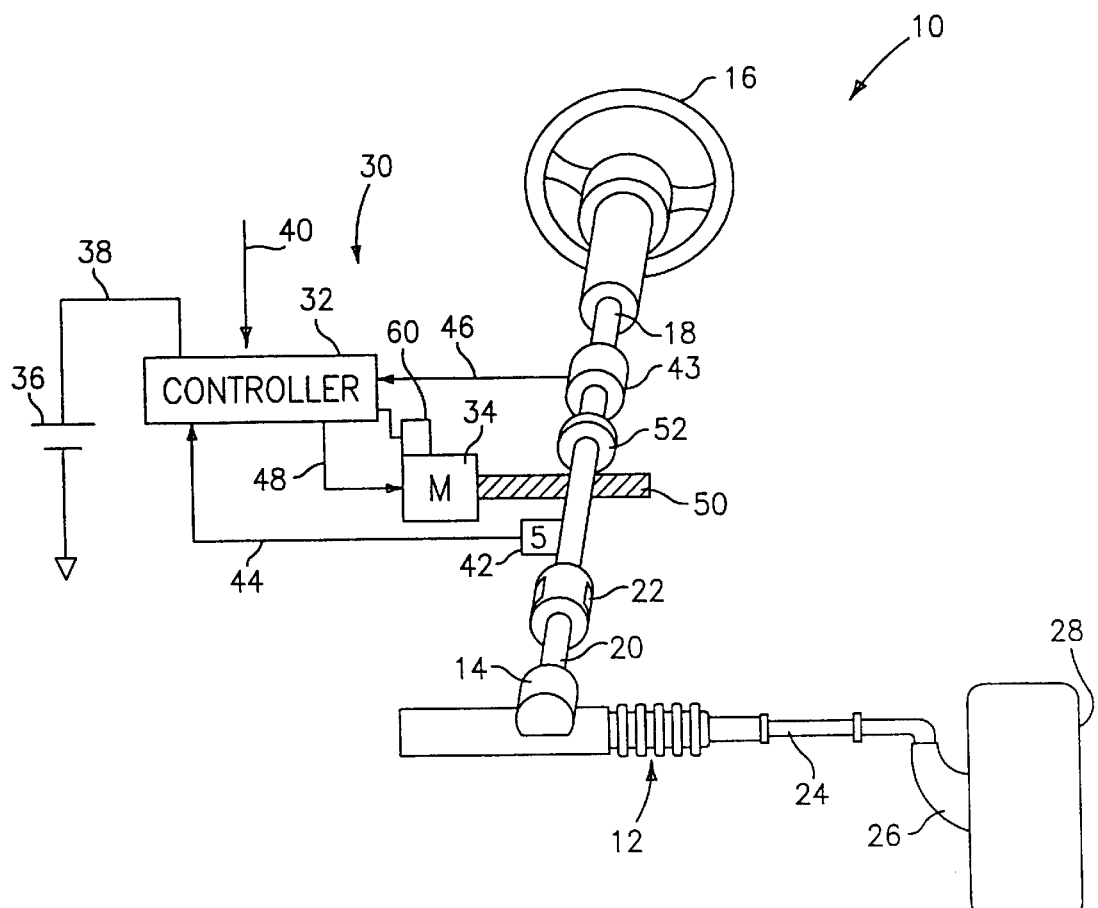
FIG. 1 is a perspective view of an electric power steering system having a solid-state relay.

Referring to FIG. 1, an Electric Power Steering ("EPS") system for a motor vehicle is generally indicated by reference numeral 10. The steering mechanism 12 is a rack-and-pinion mechanism that includes a toothed rack (not shown) and a pinion gear (also not shown) located under a gear housing 14. As the steering wheel 16 is turned, the upper steering shaft 18, which is connected to the lower steering shaft 20 through a universal joint 22, turns the pinion gear. Rotation of the pinion gear moves the toothed rack that moves a pair of tie rods 24 (only one shown) that, in turn, move the steering knuckles 26 (only one shown), which turn wheels 28 (only one shown).

EPS assist is provided through the unit generally designated by reference numeral 30, which includes a controller 32 and an electric motor 34. A solid-state relay circuit 60 is electrically connected between the controller 32 and the motor 34. The controller 32 is powered by a vehicle power supply 36 through line 38. The controller 32 receives a signal representative of the vehicle velocity on line 40. Steering pinion gear angle is measured through position sensor 42, which may be an optical encoding type sensor, variable resistance type sensor, or any other type of sensor suitable for performing the functions of position sensor 42, and fed to the controller 32 through line 44. The controller 32 activates the relay 60 in order to disconnect a neutral point of the motor 34.

As the steering wheel 16 is turned, a torque sensor 43 senses the torque applied to the steering wheel 16 by the vehicle operator. The torque sensor 43 may include a torsion bar (not shown) and a variable resistance type of sensor (also not shown), which outputs a variable resistance signal to the controller 32 through line 46, corresponding to the amount of twist on the torsion bar. Although this is the preferable torque sensor, other torque-sensing devices used with available signal processing techniques suitable for performing the functions of the torque sensor 43 may be substituted therefor.

In response to the inputs on lines 40, 44 and 46, the controller 32 sends a command signal through line 48 to the electric motor 34. The motor 34, in turn, supplies torque assist to the steering system through a worm 50 and a worm gear 52 in such a way as to provide a torque assist to the vehicle steering in addition to a driving force exerted by the vehicle operator.

Figure 2:
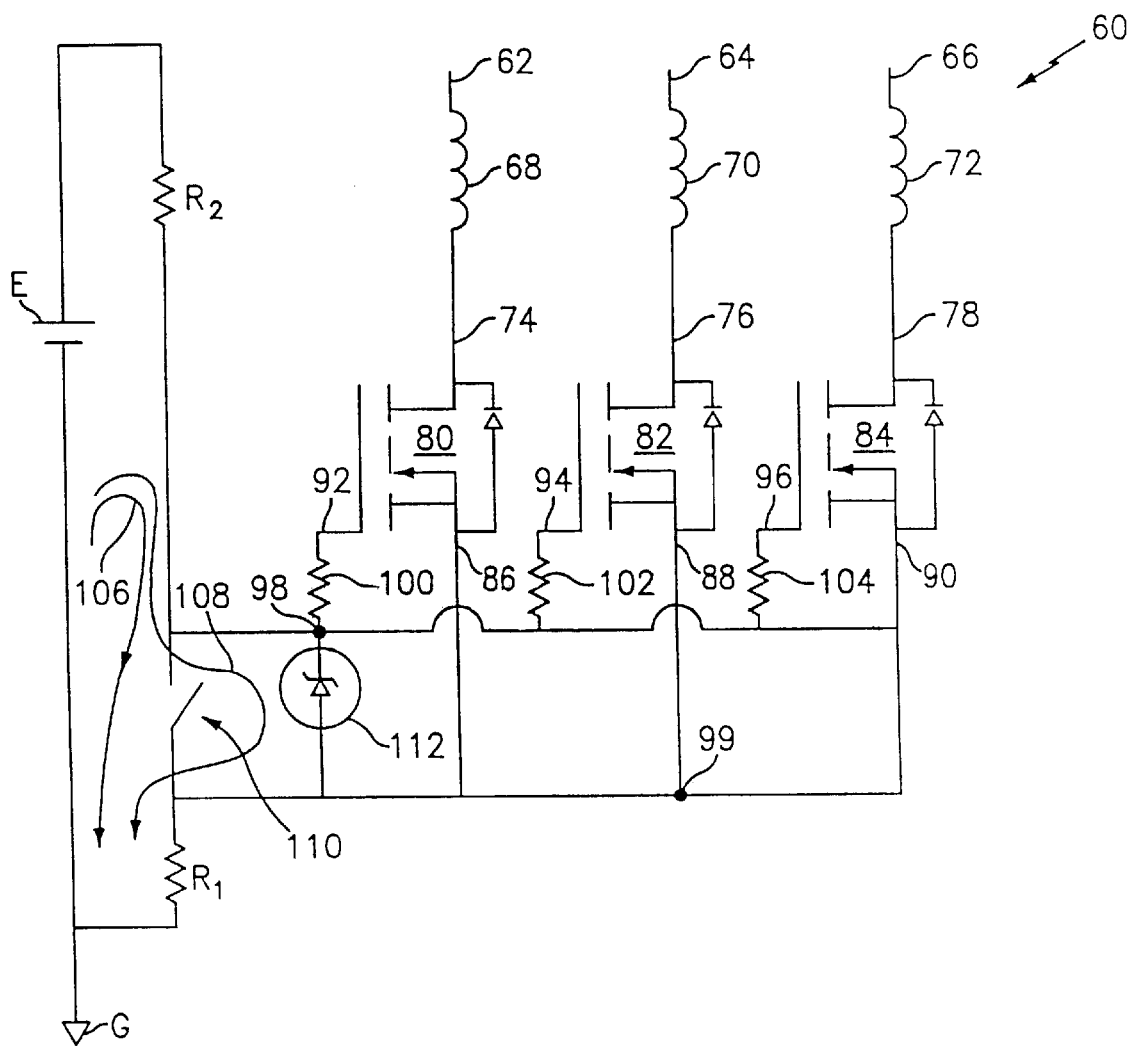
FIG. 2 is an electrical schematic diagram of the solid-state relay of FIG. 1.

Referring to FIG. 2, reference numeral 60 generally indicates an electrical schematic diagram of the solid-state relay of FIG. 1. A set of leads 62, 64 and 66 of multiphase motor wiring from the motor phase points (not shown) is provided. The set of leads 62, 64 and 66 are connected to first ends of motor inductances 68, 70 and 72, respectively. The motor inductances 68, 70 and 72 are defined by three inductive phase-windings of a motor (not shown). The second ends of the inductances 68, 70 and 72 are the neutral leads of the motor that are connected to the first terminals of three-terminal solid-state switches. In this case, the neutral leads are the drains 74, 76 and 78 of a set of n-channel enhancement-mode metal oxide field-effect transistors ("MOSFETs") 80, 82 and 84, although other suitable transistors may be employed for serving the function of the exemplary transistors. A set of second terminals, in this case the sources 86, 88 and 90 of the MOSFETs, are electrically connected to a neutral point 99 and, in turn, through a first resistance RI to ground potential G. A set of third terminals, gates 92, 94 and 96, are coupled to a control point 98 by a set of resistances 100, 102 and 104.

The point 98 constitutes part of a first current loop 108 and a second current loop 106. The first loop 108 includes a power source E, a second resistance R2, a Zener diode 112 and the first resistance R1. In other words, the point 98 and the first resistance R1 are coupled together by the parallel combination of the Zener diode 112 that acts as a voltage regulator, and a trigger switch 110. The second loop 106 includes the power source E, the second resistance R2, the switch 110 and the first resistance R1. The switch 110 may be mechanical or solid-state, as desired according to design considerations. Continuing with FIG. 2, when the switch 110 is closed, the loop 106 is closed. It follows that a fixed electric potential at the point 98 of (E)(R1)/(R1+R2) is substantially maintained. When the switch 110 is closed, the electrical potential at the sources 86, 88 and 90 is substantially equal to the potential at the point 98. The actual electrical potential at the gates 92, 94 and 96 is slightly reduced from the potential at the point 98 when a small electrical current flows through the resistors 100, 102 and 104. Thus, a slightly negative gate to source voltage may be achieved when the switch 110 is closed.

On the other hand, when the switch 110 is open, the loop 106 is open. It follows that the loop 108 is then the only loop that completes the circuit including the power source E, the resistance R2, the Zener diode 112, and the resistance R1. The voltage drop across the Zener diode 112 is chosen to be greater than a threshold voltage of the MOSFETs 80, 82 and 84. For example, if the threshold voltage of the MOSFETs is slightly less than 5.0 Volts, a Zener diode exhibiting a voltage drop of slightly more than 5.0 Volts may be employed. Thus, the position of the switch 110 affects the electric potential at the point 98, and thus controls the gate to source voltages of the MOSFETs 80, 82 and 84.

In other words, the relationship between the first loop 108 and the second loop 106 causes a change in electric potential at the point 98. A difference between the completed first loop 108 and the second loop 106 is the bypassing of the Zener diode 112 with the switch 110 in the second loop 106. Accordingly, the electric potential at point 98 changes with the state of the switch 110.

For example, during normal operation, the switch 110 will be open, the MOSFETs 80, 82 and 84 will be switched "ON" such that an electric current will flow between the respective sources 86, 88 and 90 and the respective neutral leads or drains 74, 76 and 78 in order to balance the electrical potential at the neutral point 99 with the electrical potential of the neutral leads. The trigger switch 110, for the purposes of this example, is a relay trigger. This trigger switch 110 has to carry very small currents and open and close at very small voltages.

Under normal working conditions, all the MOSFETs are "ON", thereby connecting all neutral leads or drains 74, 76 and 78 to the neutral point 99 through the MOSFETs 80, 82 and 84 and the sources 86, 88 and 90. When a fault is detected, the trigger switch 110 is closed such that the MOSFETs 80, 82 and 84 are turned off. The stored energy is then dissipated. Accordingly, the unclamped safe operating area of the MOSFETs is matched such that the energy can be suitably dissipated. For example, if the devices are rated at 60 Volts (V), the motor inductance is 500 micro-Henry ($\mu$H), and the motor current to be opened is 50 Ampere (A), then the MOSFETs to be employed should be rated for a triangular current going from 50A to 0A with 60V at the terminal for 416 micro-seconds ($\mu$sec). Therefore, the selected MOSFETs are preferred above the described amount of transient power.

In operation under normal conditions, assuming R1 is approximately equal to R2, the gates of all the transistors are at a direct current (DC) potential of approximately 0.5 $V_{bat}$. Thus, the circuit will function only if the battery voltage is approximately 2 times greater than that of the gate to source threshold voltage that is required to keep the transistor at the "ON" state. In an EPS system that has a 12 Volt power source, since the battery voltage may go down to 7 Volts under certain conditions, logic level FETs having a relatively low gate to source threshold voltage such as 3.5 Volts should be used. However, for significantly higher voltage systems, relatively inexpensive or normal FETs having slightly higher gate to source threshold voltages may be used since the voltage drops across their terminals will be only a small percentage of the larger supply voltage.

It is to be understood that other types of transistors may be developed or used for both the MOSFETs 80, 82 and 84, as well as for the switch 110. For example, n-channel depletion-mode MOSFETs may be substituted for the exemplary n-channel enhancement-mode MOSFETs described herein, with a corresponding inversion of the state of the switch 110 for the purpose of disconnecting a neutral point. In addition, the resistances R1 and R2 may be adjusted for different battery voltages as well, and need not be equal. For example, the resistance value of R1 might be twice the resistance value of R2, thus permitting the use of MOSFETs having a threshold voltage of 4.5 Volts in a system where the battery voltage may fall to 7.0 Volts.

It will also be understood that a person of ordinary skill in the pertinent art may make modifications to the embodiments shown herein without departing from the scope or spirit of the claims. While the present invention has been described by way of example as carried out in an exemplary embodiment thereof, such exemplary description shall not be construed to be limiting to the claims, which are intended to cover the invention broadly within the true scope and spirit of the disclosure.

What is claimed is:

1. A circuit for disconnecting a neutral point in an electric machine comprising:
   at least one inductance;
   at least one three-terminal solid-state switch, the at least one solid-state switch having a first terminal coupled to the at least one inductance, a second terminal coupled to the neutral point; and a third terminal for controlling a flow of current between the first terminal and the second terminal; and
   a controlling circuit coupled to the third terminal of the at least one three-terminal solid-state switch, the controlling circuit comprising:
      a first loop having a power source, at least one resistance, and a signal regulator to maintain a first signal at the third terminal of the at least one solid-state switch; and
      a second loop having the power source, the at least one resistance, and a trigger switch being controllably switched closed, to maintain a second signal at the third terminal of the at least one solid-state switch to thereby change the state of the at least one three-terminal solid-state switch.

2. The circuit of claim 1 wherein the second loop causes the at least one three-terminal solid-state switch to disconnect the first terminal from the second terminal and thereby disconnect the neutral point from the at least one inductance.

3. The circuit of claim 1 wherein:
   the at least one inductance comprises three inductances; and
   the at least one three-terminal solid-state switch comprises three three-terminal solid-state switches; and
   the controlling circuit is coupled to each of the three three-terminal solid-state switches.

4. The circuit of claim 1 wherein the at least one resistance comprises two resistors.

5. The circuit of claim 4 wherein the two resistors are substantially equal in value.

6. The circuit of claim 1 wherein the signal regulator comprises a Zener diode.

7. The circuit of claim 1 wherein the at least one three-terminal solid-state switch comprises an n-channel metal-oxide semiconductor field effect transistor.

8. The circuit of claim 1 wherein the trigger switch comprises a solid-state switch.

9. The circuit of claim 1 wherein the trigger switch comprises a relay.

10. An Electric Power Steering system comprising:
   a motor having a neutral point, coupled to a driving column for assisting steering; and
   a circuit for disconnecting the neutral point in the motor, the circuit comprising:
      at least one inductance of the motor;
      at least one three-terminal solid-state switch, the at least one solid-state switch having a first terminal coupled to the at least one inductance, a second terminal coupled to the neutral point; and a third terminal for controlling a flow of current between the first terminal and the second terminal; and
      a controlling circuit coupled to the third terminal of the at least one three-terminal solid-state switch, the controlling circuit comprising:
         a first loop having a power source, at least one resistance, and a voltage regulator to maintain a first voltage upon the third terminal of the at least one solid-state switch; and
         a second loop having the power source, the at least one resistance, and a trigger switch being controllably switched closed, thereby closing the second loop such that the first voltage is altered from that of the first loop causing the at least one three-terminal solid-state switch to switch off to electrically disconnect the first terminal from the second terminal and thereby disconnect the neutral point from the at least one inductance.

11. A method for disconnecting a neutral point in an electric machine comprising:
   regulating a signal at a control terminal of a solid-state switch to couple the neutral point to the electric machine;
   closing a trigger switch to alter the signal at the control terminal of the solid-state switch; and
   opening the solid-state switch in accordance with the altered signal at the control terminal to thereby disconnect the neutral point from the electric machine.

* * * * *